United States Patent

[11] 3,540,542

[72] Inventor Leslie Arthur Hopkins
 Dibden Purlieu, Southampton, England
[21] Appl. No. 733,005
[22] Filed May 29, 1968
[45] Patented Nov. 17, 1970
[73] Assignee Hovercraft Development Limited
 London, England
 a British company
[32] Priority June 2, 1967
[33] Great Britain
[31] 25,689/67

[54] MEANS FOR BOUNDING A SPACE FOR RECEIVING PRESSURISED GAS
 9 Claims, 5 Drawing Figs.
[52] U.S. Cl. .................................................. 180/127
[51] Int. Cl. .................................................. B60v 1/16
[50] Field of Search .......................................... 180/127, 128, 126

[56] References Cited
UNITED STATES PATENTS
| | | | |
|---|---|---|---|
| 3,211,246 | 10/1965 | Lewis............................ | 180/127 |
| 3,244,244 | 4/1966 | Cockerell..................... | 180/128 |
| 3,249,166 | 5/1966 | Cockerell et al.............. | 180/128 |

FOREIGN PATENTS
| | | | |
|---|---|---|---|
| 958,996 | 5/1964 | Great Britain................ | 180/127 |

Primary Examiner—A. Harry Levy
Attorney—Cameron, Kerkam & Sutton

ABSTRACT: A flexible wall for containing a gas cushion of a gas cushion vehicle comprises a succession of independently deflectable wall members. Each member is substantially U-shaped in horizontal section, the concavity being arranged to face the gas cushion with the two sides connected to the vehicle to constrain outward deflection of the member. The concavity of each member is arranged to present a generally convex vertical profile to the gas cushion, the profile preferably being upwardly divergent by, for example, the concavity being discontinuously inclined upwardly and outwardly from its lower end.

Patented Nov. 17, 1970 3,540,542

MEANS FOR BOUNDING A SPACE FOR RECEIVING PRESSURISED GAS

This invention relates to flexible walls for containing at least in part the pressurized gas cushions of air cushion vehicles. In particular the invention is concerned with flexible walls of the kind comprising a succession of independently deflectable flexible wall members each having an outer portion which faces the gas cushion and a pair of side portions which extend inwardly from the said outer portion into the said cushion, adjacent side portions of neighbouring wall members being contiguous, and constraining means for constraining the wall members against outward deflection by the pressure of the gas cushion, whereby inflation of the wall members of the pressurized gas cushion urges the contiguous side portions of neighbouring wall members towards each other.

Such walls in addition to serving the function of, at least in part, containing a gas cushion beneath a gas cushion vehicle, also find general application in bounding spaces for receiving pressurized gas or indeed liquids, be the space in part bounded or not by structures, including other forms of wall, to which the flexible walls may or may not be attached. Accordingly where the context permits, the flexible walls herein referred to are to be understood to be so applicable.

The invention has, however, primarily been developed in connection with such flexible walls for gas cushion vehicles, and particularly those intended for travel over water. It is known that when travelling over water, under certain operating conditions, for example, over a series of waves, successive contact between the front-disposed wall structure of a gas cushion vehicle and the waves gives rise to large leaks of cushion gas which, combined with increasing drag forces can, under extreme conditions, build up to pull the front of the vehicle downwardly on to the water.

What happens is that initial contact between the front-disposed wall structure and a wave causes inward deflection of the wall structure and a loss of gas from the cushion which momentarily exceeds that supplied to the cushion space and this results in downward movement of the front of the vehicle body. Contact between the wall structure and the next wave of the series causes a further loss of gas from the cushion and a further downward movement of the vehicle front, the action being progressive from wave to wave.

Various expedients have been proposed to overcome this difficulty, that is to say to promote restoration of a wall after inward deflection, to its undeflected contour or shape, or otherwise to enhance the stability of vehicles in the circumstances referred to. Indeed vehicles fitted with walls of the kind referred to above, if inwardly inclined, do possess stabilizing qualities arising from the fact that when the vehicle is inclined in some way relative to its supporting surface, e.g. by the impingement of waves, the wall members of the downwardly inclined side of the vehicle are folded inwardly at their lower tips and the effective cushion area under the vehicle is extended to the region of the fold. This extension of the cushion area in the direction of vehicle dip will result in a corresponding shift in the centre of pressure through which resultant pressure force of the supporting gas cushion may be considered to act. With the vehicle in a horizontal plane, the centre of pressure will be vertically below the centre of gravity of the vehicle so as to produce a stable situation, but with the vehicle tipped as above described, the centre of pressure, being moved towards the direction of dip, will provide on the vehicle a restoring moment tending to restore the vehicle to a horizontal disposition and bring the centre of pressure once more below the centre of gravity of the vehicle.

The restoring moment produced in this way, however, may well only be weak. It is therefore an object of this invention to provide for an enhanced restoring moment in such vehicles. Another object is to provide for accelerated restoration of members of a wall of the kind referred to, to their initial contour or shape after inward deflection thereof.

According to one aspect of the invention, therefore, means are provided for, at least in part, containing a pressurised gas cushion of a gas cushion vehicle, the said means comprising a flexible wall consisting of a succession of independently deflectable flexible wall members, each having an outer portion which faces the gas cushion, and a pair of side portions which extend inwardly from the said outer portion into the said cushion, adjacent side portions of neighbouring wall members being contiguous, and constraining means for constraining the wall members against outward deflection by the pressure of the gas cushion, whereby inflation of the wall members by the pressurized gas cushion urges the contiguous side portions of neighbouring wall members towards each other, in which the outer portion of at least a number of the wall members, when those members are inflated, is arranged to present a generally convex profile to the gas cushion.

Preferably the said convex profile is upwardly divergent and in one embodiment of the invention the outer portion of at least the said number of wall members is discontinuously inclined upwardly and outwardly from its free or lower edge, being relatively more steeply inclined with respect to the horizontal towards its lower part than towards its upper part.

The said constraining means are conveniently employed to constrain the outer portion of the wall members in question to present the required profile, and the constraining means in turn conveniently comprise the side portions of the wall members. In connection with the number of wall members, the outer portions of which will be profiled as indicated above, it will be understood that while in many instances the outer portion of every wall member constituting a flexible wall in accordance with the invention will be so profiled, this is not essential. For example, if the air cushion vehicle to which the flexible wall is secured is of the side wall type and/or if counter action is only required against the front or nose of a vehicle dipping into waves, then only that part of the wall or skirt which contains the gas cushion at the front of the vehicle would be provided in the form of a flexible wall in accordance with the invention in which the outer portions of the wall members were profiled as indicated.

According to another aspect of the invention there are provided means for bounding a space for receiving pressurized gas comprising a structure such as the body of a gas cushion vehicle forming one boundary part of the space and a flexible wall forming another boundary part of the space, the flexible wall comprising a succession of independently deflectable flexible wall members each having an outer portion which extends away from the said structure and which faces the said space so as to form part of a boundary surface, and a pair of side portions which extend inwardly from the said outer portion towards the said space, adjacent side portions of neighbouring wall members being contiguous, constraining means being provided to constrain the wall members against deflection away from said space by the pressure of gas therein, whereby inflation of said wall members by pressurized gas urges the contiguous side portions of neighbouring wall members towards each other, wherein at least some of the wall members have their outer portion arranged to present a generally convex profile to the bounded space.

The outer portion of the wall members may be profiled and constrained in the same way as indicated above in connection with the preceding aspect of the invention.

With a vehicle having the wall members of the present invention, the convex nature of the wall members ensures that the rate of extension of the gas cushion will increase more rapidly with vehicle dip as the amount of vehicle dip increases, so that the restoring moment acting on the vehicle for large vehicle dips will be increased above the value that would result if the wall members presented a linear or concave vertical cross section to the cushion space.

In order that the invention may be more fully understood, an embodiment thereof will now be described, by way of example, with reference to the accompanying drawings, in which.

Figure 1:
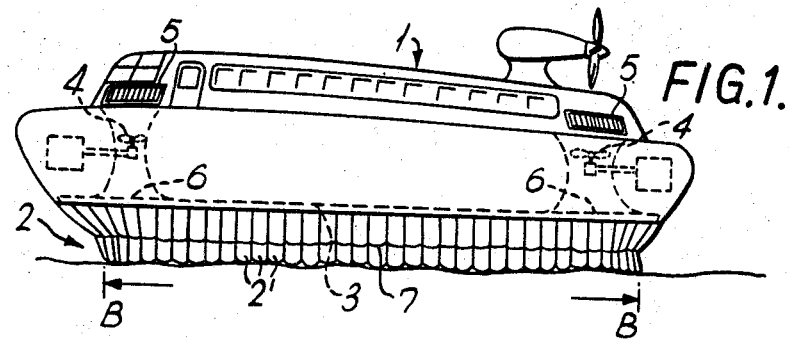
FIG. 1 is a side elevation of one particular form of gas cushion vehicle embodying the invention.
Figure 2:
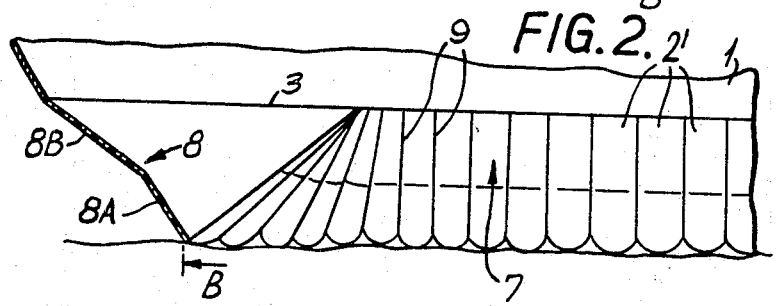
FIGS. 2 to 4 are longitudinal sectional elevations on an enlarged scale taken, by way of example, through the front part of the vehicle illustrated in FIG. 1 to show the disposition of the wall members for different inclinations of the vehicle to its supporting surface.
Figure 5:
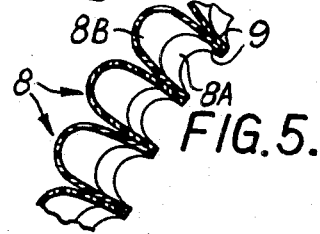
FIG. 5 is a fragmentary cross section through the wall members.

Referring first to FIGS. 1, 2 and 5, a gas cushion vehicle 1, has a flexible wall 2 formed by a succession of independently deflectable wall members 2' depending from its bottom surface 3. The vehicle is provided with fans 4 which in operation of the vehicle draw air through side intakes 5 and propel it through ports 6 in the bottom surface 3 to form for the vehicle a supporting gas cushion contained in a space 7 bounded at its upper part by the surface 3 and at its side parts by outer portions 8 of the wall members 2'. FIGS. 1, 2 and 5 show the wall members 2' in their inflated nondeflected states corresponding to a horizontal disposition of the vehicle and as may be seen from FIG. 2, in the embodiment of the invention illustrated, each outer portion 8 presents an upwardly divergent convex profile to the cushion space, composed of a lower part 8A of linear cross section which is more steeply inclined to the horizontal than is an upper part 8B, also of linear cross section.

The parts 8A and 8B are constrained against outward movement by side portions 9 of the wall members 2' which extend inwardly and upwardly from the outer portions 8 of the wall members up to the undersurface 3 of the vehicle.

Figure 3:
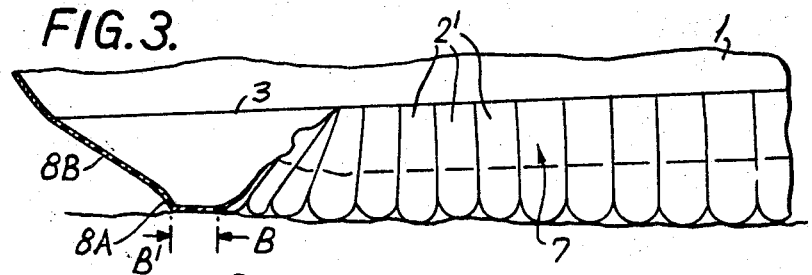
Figure 4:
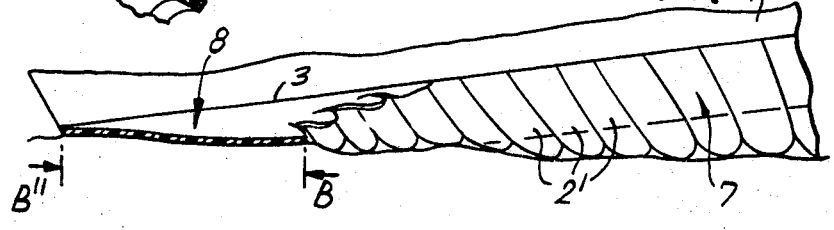

When the vehicle is disposed in a horizontal plane, the supporting gas cushion extends between the limits B-B indicated in FIG. 1 and in FIG. 2. The stabilizing action of the vehicle is best seen from FIGS. 2—4. As may be seen from comparison of FIGS. 2 and 3, when the vehicle is dipped forwards or sideways by a small amount, the lower part 8A of the outer portion 8 folds inwards (as shown in FIG. 3) to increase the forward extension of the gas cushion by an amount B-B'. As explained at the outset, this extension results in a corresponding shift of the centre of pressure of the cushion gas which produces a moment on the vehicle 1 tending to restore it to its horizontal disposition. However, as may be seen by comparison of FIG. 4 with FIGS. 2 and 3, when the vehicle dips relative to the surface over which it is travelling by a larger amount, at least a portion of the upper part 8B of the outer portion 8 also folds inwards (as shown in FIG. 4) and because of the lesser inclination of the part 8B to the horizontal, the gas cushion is extended by a significantly greater amount B-B'' of the vehicle. Thus, with the embodiment of the invention illustrated, although for small dips the vehicle 1 will behave like those with previously known flexible walls of the kind described, it will respond more positively, strongly and quickly to greater dips than would these previous vehicles, thereby making it especially advantageous for use in choppy seas for example.

While in the embodiment described above, the outer portion of each wall member is arranged to present a generally convex profile to the gas cushion, as indicated at the outset, this is not essential. Only those wall members at the front of the vehicle might be arranged to present such a profile, and certainly it is not envisaged that a flexible wall in accordance with this invention will necessarily constitute a complete wall for a gas cushion vehicle. For example, in side wall air cushion vehicles, only the front wall may constitute a flexible wall in accordance with the invention. It may even be satisfactory, rather than provide for a discrete number of successive flexible wall members to be arranged to present a convex profile to the gas cushion, to provide for the appropriate profiling of only intermittent wall members, e.g. alternate wall members.

Finally, while in the embodiment described the wall members are constrained against outward deflection and their outer portions also constrained to adopt the appropriate profile by their side portions, they may be otherwise constrained by appropriate tie means. It is also not essential that the side portions be directly connected to, for example, the underside of a vehicle; rather they may be indirectly connected thereto.

I claim:

1. Means for at least in part containing a pressurized gas cushion of a gas cushion vehicle, the said means comprising a flexible wall consisting of a succession of independently deflectable flexible wall members each having an outer portion which faces the gas cushion and a pair of side portions which extend inwardly from the said outer portion into the said cushion, adjacent side portions of neighbouring wall members being contiguous, the wall members being constrained against outward deflection by the pressure of the gas cushion, whereby inflation of the wall members by the pressurized gas cushion urges the contiguous side portions of neighbouring wall members towards each other, in which the outer portion of at least a number of the wall members, when those members are inflated, is inclined upwardly and outwardly from its free or lower edge, so as to present a generally convex, upwardly divergent profile to the gas cushion.

2. Means, as claimed in claim 1, in which the outer portion of the said wall members is discontinuously inclined upwardly and outwardly from its free or lower edge, being relatively more steeply inclined, with respect to the horizontal, towards its lower part than towards its upper part.

3. Means, as claimed in claim 1, in which the outer portion of each wall member is constrained by constraining means to present the required profile.

4. Means, as claimed in claim 3, in which the side portions of each wall member comprise the said constraining means.

5. Means for bounding a space, for receiving pressurized gas, comprising a structure such as the body of a gas cushion vehicle forming one boundary part of the space and a flexible wall forming another boundary part of the space, the flexible wall comprising a succession of independently deflectable flexible wall members each having an outer portion which extends away from the said structure and which faces the said space so as to form part of a boundary surface, and a pair of side portions which extend inwardly from the said outer portion towards the said space, adjacent side portions of neighbouring wall members being contiguous, the wall members being constrained against deflection away from the said space, by the pressure of gas therein, whereby inflation of said wall members by pressurized gas urges the contiguous side portions of neighbouring wall members towards each other, wherein at least some of the wall members have their outer portion inclined upwardly and outwardly from its free or lower edge so as to present a generally convex, upwardly divergent profile to the bounded space.

6. A flexible wall for bounding, at least in part, a pressurized gas cushion of a gas cushion vehicle, the flexible wall comprising a succession of wall members of flexible sheet material each consisting of an outer cushion bounding portion which is constrained to resist the cushion pressure and outward deflection, and two side portions which extend inwardly into the gas cushion, adjacent side portions of neighbouring wall members being contiguous, the wall members being arranged for independent deflection in which the outer cushion bounding portions of the wall members are constrained on inflation to be inclined upwardly and outwardly from their free or lower edges so as to present an upwardly divergent convex profile to the gas cushion.

7. A flexible wall, as claimed in claim 6, in which the outer cushion bounding portions are discontinuously inclined upwardly and outwardly from their free or lower edge, being relatively more steeply inclined with respect to the horizontal towards their lower parts than towards their upper parts.

8. A flexible wall, as claimed in claim 6, in which the outer portions of the wall members are constrained to adopt the said profile by their side portions.

9. A gas cushion vehicle wherein the gas cushion is contained, at least in part, at the front end by a flexible wall comprising a succession of independently deflectable flexible wall members each having an outer portion which faces the gas cushion and a pair of side portions which extend inwardly from the said outer portion into the said cushion, adjacent side portions of neighbouring wall members being contiguous so that on inflation, the wall members being constrained against outward deflection by the pressure of the gas cushion, the contiguous side portions of neighbouring wall members are urged towards each other, the outer portion of the wall members being so formed and constrained as to be inclined upwardly and outwardly from its free or lower edge, so as to present an upwardly divergent convex profile to the gas cushion.

PO-1050
(5/69)

UNITED STATES PATENT OFFICE
CERTIFICATE OF CORRECTION

Patent No. 3,540,542          Dated  November 17, 1970

Inventor(s)  Leslie Arthur Hopkins

It is certified that error appears in the above-identified patent and that said Letters Patent are hereby corrected as shown below:

Column 3, line 47, after "B-B"" insert --than would be the case if the part 8B were replaced by an upward extension of the part 8A. As already explained, it is this increase in the rate of gas cushion extension with the amount of vehicle dip which enhances the stabilizing properties--.

SIGNED AND SEALED

FEB 23 1971

(SEAL)
Attest:

Edward M. Fletcher, Jr.
Attesting Officer

WILLIAM E. SCHUYLER, JR.
Commissioner of Patents